(12) United States Patent
Peng et al.

(10) Patent No.: US 8,228,779 B2
(45) Date of Patent: Jul. 24, 2012

(54) SYSTEM TO DELIVER LIGHT TO A SLIDER FOR HEAT-ASSISTED RECORDING

(75) Inventors: Chubing Peng, Sewickley, PA (US); Edward Charles Gage, Mars, PA (US)

(73) Assignee: Seagate Technology LLC, Cupertino, CA (US)

( * ) Notice: Subject to any disclaimer, the term of this patent is extended or adjusted under 35 U.S.C. 154(b) by 543 days.

(21) Appl. No.: 12/235,075

(22) Filed: Sep. 22, 2008

(65) Prior Publication Data

US 2010/0074063 A1    Mar. 25, 2010

(51) Int. Cl.
*G11B 7/135*    (2012.01)
*G11B 7/00*    (2006.01)

(52) U.S. Cl. ............... 369/112.27; 369/44.12; 369/300

(58) Field of Classification Search .......... 369/300, 369/44.12, 112.27, 112.09, 112.14
See application file for complete search history.

(56) References Cited

U.S. PATENT DOCUMENTS

| | | | |
|---|---|---|---|
| 5,835,458 A * | 11/1998 | Bischel et al. ............ | 369/44.12 |
| 6,174,748 B1 * | 1/2001 | Jeon et al. ............ | 438/31 |
| 6,944,112 B2 | 9/2005 | Challener ............ | 369/112.27 |
| 7,027,700 B2 | 4/2006 | Challener ............ | 385/129 |
| 7,151,738 B2 | 12/2006 | Peng ............ | 369/112.27 |
| 7,155,732 B2 | 12/2006 | Rausch et al. ............ | 720/659 |
| 2001/0006436 A1 | 7/2001 | Akiyama et al. ............ | 360/59 |
| 2004/0001394 A1* | 1/2004 | Challener et al. ............ | 369/13.32 |
| 2004/0213582 A1* | 10/2004 | Joyner ............ | 398/183 |
| 2005/0265139 A1* | 12/2005 | Gomez et al. ............ | 369/44.14 |
| 2009/0310459 A1* | 12/2009 | Gage et al. ............ | 369/100 |

FOREIGN PATENT DOCUMENTS

WO    WO 2004/003932 A2    1/2004
WO    WO 2005/034093 A1    4/2005

* cited by examiner

*Primary Examiner* — Mohammad Ghayour
*Assistant Examiner* — Carl Adams
(74) *Attorney, Agent, or Firm* — Alan G. Rego; Westman, Champlin & Kelly, P.A.

(57) ABSTRACT

In a particular embodiment, a recording head includes a tapered waveguide adapted to propagate light from a light source a slider adjacent to a surface of a storage medium. The tapered waveguide is adapted to output an elliptical beam to a grating coupler on a slider. The recording head further includes a slider waveguide extending substantially normal to a surface of the storage medium and a grating adapted to couple the elliptical beam into the slider waveguide.

19 Claims, 19 Drawing Sheets

SYSTEM TO DELIVER LIGHT TO A SLIDER FOR HEAT-ASSISTED RECORDING

FIELD

The present invention relates generally to a system to deliver light to a magnetic slider for heat-assisted recording.

BACKGROUND

In thermally assisted magnetic recording, information bits are recorded on a storage layer at elevated temperatures, and the size of the heated area in the storage layer determines the data bit dimension. One way to achieve a tiny confined heating area is to use an optical near-field transducer, such as a plasmonic optical antenna and an aperture, integrated in an optical waveguide having a high refractive index contrast. Light propagating in such an optical waveguide can be focused by an optical focusing element, such as a planar solid immersion mirror. However, it can be challenging to launch light into the optical waveguide of a slider with low-cost, with good alignment tolerance, and with high light delivery efficiency. Embodiments described below provide solutions to these and other problems, and offer other advantages over the prior art.

SUMMARY

In a particular embodiment, a recording head includes a tapered waveguide adapted to propagate light from a light source in a direction that is substantially parallel to a surface of a storage medium. The tapered waveguide is adapted to output an elliptical beam. The recording head further includes a slider waveguide extending substantially normal to a surface of the storage medium and a grating adapted to couple the elliptical beam into the slider waveguide.

In another particular embodiment, a system is disclosed that includes a storage medium and a recording head that is movable relative to the storage medium and that is adapted to record data to the storage medium. The recording head includes a slider waveguide extending normal to a surface of the storage medium and adapted to direct light onto the surface. The recording head further includes a grating associated with the waveguide and adapted to couple the light into the waveguide and a tapered waveguide. The tapered waveguide is to propagate the light from a laser source and to shape the light into a beam onto the grating via the output such that the beam has a beam size that matches a size of the grating.

In still another particular embodiment, a method is disclosed that includes focusing light from a light source into an elliptical beam via a tapered waveguide and coupling the elliptical beam from the tapered waveguide into a slider waveguide via a grating. The method further includes focusing the elliptical beam into a focused beam via the slider waveguide to locally heat a spot at a surface of a recording media.

Other features and benefits that characterize embodiments of the present invention will be apparent upon reading the following detailed description and review of the associated drawings.

DETAILED DESCRIPTION

In a particular embodiment, an optical device is disclosed that can be used in recording heads of data storage devices. In a particular aspect, the optical device can be used in heat-assisted magnetic recording or optical recording and can be included in disc drives to facilitate recording to recording media having high anisotropy.

Figure 1:
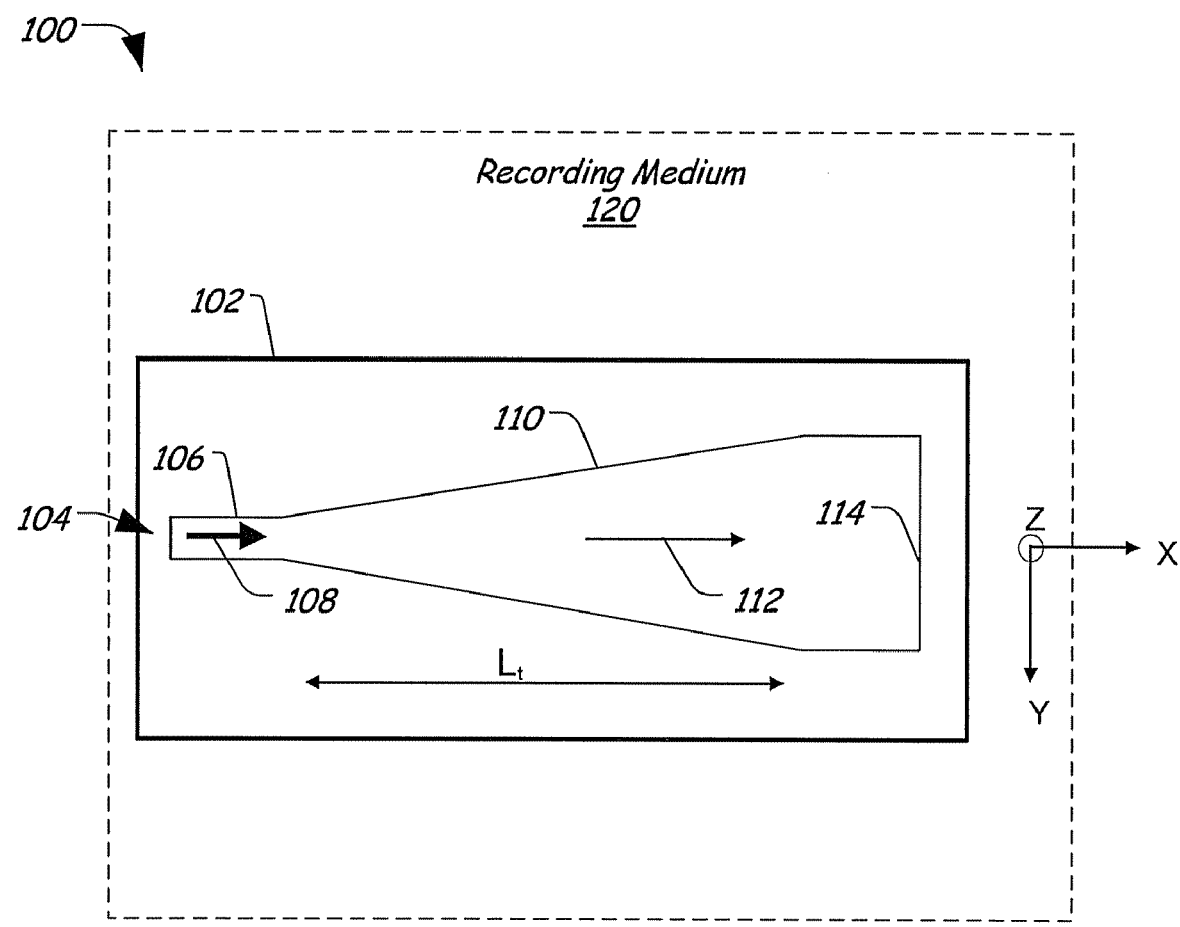
FIG. 1 is a top view of a particular illustrative embodiment of a recording head including a channel waveguide having a tapered portion to expand a propagating beam of light.

FIG. 1 is a top view of a particular illustrative embodiment of a system 100 including recording head 102 that has a tapered waveguide 104. In a particular embodiment, the tapered waveguide 104 can be rigid, semi-rigid, flexible, or any combination thereof. For example, the tapered waveguide 104 can include a rigid portion and a flexible portion.

The recording head 102 extends over a recording medium 120. The tapered waveguide 104 includes a channel waveguide portion 106 that propagates light from a light source to a tapered waveguide portion 110, which operates as a beam expander to expand the light 112 as it approaches an end portion 114 of the tapered waveguide 104. In a particular example, it is desirable to match a propagation mode of the tapered waveguide 104 to a propagation mode of a slider waveguide (such as the slider waveguide 212 illustrated in FIGS. 2 and 4). Such propagation mode matching can be achieved via the tapered waveguide 104. A tapered waveguide portion 110 of the tapered waveguide 104 expands the light beam and converts the light beam from a first mode to another mode to better match a propagating mode of the slider waveguide.

Figure 2:
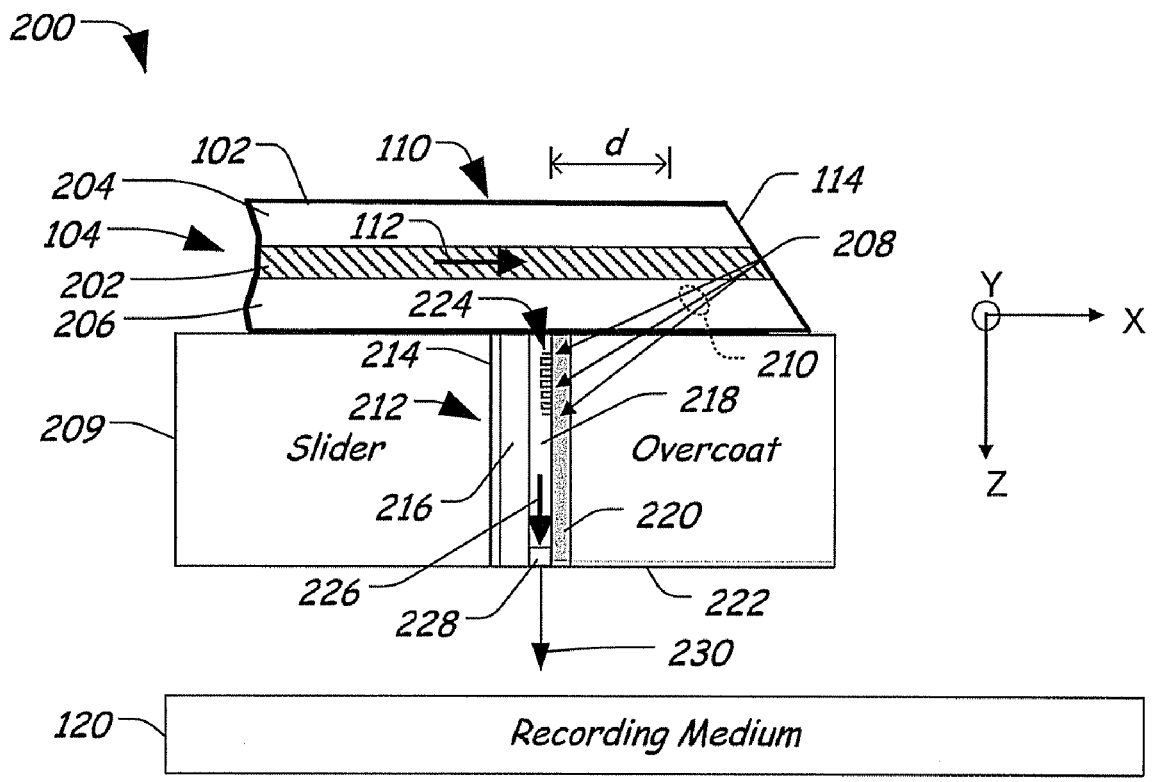
FIG. 2 is a block diagram of a system including a cross-sectional view of the recording head illustrated in FIG. 1, which recording head includes a slider waveguide having a grating coupler and a solid immersion mirror to focus light onto a surface of a recording medium.

In a particular embodiment, a beam of light 108 from a light source is first launched into channel waveguide portion 106 of the tapered waveguide 104 and is expanded by the tapered waveguide portion 110. In a particular example, a laser module, such as a laser diode, can be used to produce a focused light beam that is coupled into the tapered waveguide 104 via a grating (not shown). The end portion 114 of the tapered waveguide 104 is wedged and mirrored (as illustrated in FIG. 2) to direct the expanded light 112 as an asymmetrical or elliptical beam toward a grating of a slider waveguide (such as the slider waveguide 212 illustrated in FIG. 2). In a particular example, the elliptical beam has a propagating mode that approximately matches a propagating mode of the slider waveguide.

The tapered waveguide portion 110 has a length ($L_t$) over which the width of the tapered waveguide 104 is expanded to provide the beam expansion. In a particular embodiment, the tapered waveguide portion 110 can have a linear taper. In a particular example, the linear taper has a thickness of approximately 4.16 µm and a width of approximately 4.16 µm at a junction between the channel waveguide portion 106 and the tapered waveguide portion 110. In this example, the linear taper expands to a width of approximately 30.16 µm at the end portion 114 over the length ($L_t$) of approximately 1 mm. In an alternative embodiment, the light (beam) expansion in the tapered waveguide 104 can be provided via a mode-index lens, a diffraction optical element, a linear taper, a parabolic taper, or any combination thereof.

FIG. 2 is a block diagram of a system 200 including a cross-sectional view of the recording head 102 illustrated in FIG. 1, which recording head 102 includes the tapered waveguide 104. The tapered waveguide 104 includes an optically transparent core 202 sandwiched between dielectric layers 204 and 206. The waveguide core 202 propagates light 112 toward the end portion 114 of the tapered waveguide 104. The end portion 114 is angled (wedged) and includes a mirror 208 to direct the light 112 out of the tapered waveguide 104 onto a slider 209 that includes a grating coupler 224 associated with a slider waveguide 212. The light beam 210 exiting from the tapered waveguide 104 has a substantially elliptical shape. In a particular embodiment, the tapered waveguide 104 is wedged and coated with a highly reflective layer on the wedge (i.e., at the end portion 114), such as aluminum (Al), gold (Au), and silver (Ag), a dielectric multilayer stack, or any combination thereof. In a particular example, the highly reflective layer or layers can form the mirror 208 at the end portion 114 of the tapered waveguide 104. In a particular embodiment, the tapered portion 110 of the tapered waveguide 104 can be fabricated on top of the slider using wafer deposition methods to form a rigid portion, and a flexible portion of the tapered waveguide 104 can be used to couple into this rigid tapered portion before exiting the beam onto the grating coupler 224. In a particular example, if the laser light source was coupled to the back of the slider, the recording head can be very compact and low cost. In a particular example, if the tapered waveguide 104 was flexible, the flexibility of the waveguide could be used to couple light into the slider waveguide 212 with little or any taper.

In a particular embodiment, the mirror 208 can have curved edges that can be in the shape of a parabola to direct light out from the tapered waveguide 104 to a focal area that corresponds to the grating coupler 224. In a particular example, the mirror 208 can be concave or convex and can be formed by varying an angle of the slope along the end 114 of the tapered waveguide 104 and metalizing the end 114 or by depositing a dielectrica material of higher or lower refractive index and then metalizing the end 114. The curvature can be controlled by adjusting a rate at which an ion mill angle is changed during the etch process. In an alternative embodiment, the mirror 208 could be replaced with a grating (not shown) to bend light from the tapered waveguide 104 into the slider waveguide 212. In another embodiment, an extra mirror can also be used to control and align the output beam (i.e., the asymmetric beam 210).

The slider waveguide 212 in a region proximate to the grating coupler 224 includes a mirror layer 214, a bottom dielectric layer 216, the optically transparent core 218, a top dielectric layer 220, and a thick dielectric overcoat layer 222. In a particular non-limiting example, the mirror layer 214 is formed from gold (Au), and the bottom and top dielectric layers 216 and 220 are formed of $Al_2O_3$. In this particular example, the optically transparent core layer 218 is approximately 125-nm thick and made from $Ta_2O_5$. In this example, the overcoat layer 222 has a thickness of approximately 20 µm. In a particular embodiment, the tapered waveguide can be coupled to the overcoat layer 222 of the slider 209 by ultraviolet (UV) curing.

The grating coupler 224 is adapted to couple the asymmetric beam 210 into a waveguide core 218 of the slider waveguide 212. The coupled beam is represented as a light beam 226, which propagates along the waveguide core 218 to a focusing element, such as a planar solid immersion mirror (PSIM) 228. The PSIM 228 can include a parabolic element to condense the light beam 226 into a focused beam 230, which can be directed onto a surface of the recording medium 120. In a particular example, the focused beam 230 can locally heat the surface of the recording medium 120 to facilitate heat-assisted magnetic recording, for example, in conjunction with a magnetic field.

In a particular example, the tapered waveguide 104 propagates light from a light source (such as a laser) to the slider 209 and shapes (expands) the light 112. The tapered waveguide 104 includes a mirror to reflect the expanded light as an asymmetric beam 210 onto a plane near the slider 209. In a particular embodiment, the asymmetric beam 210 is expanded by the tapered waveguide portion 110 and reflected by the mirror 208 at the wedged end portion 114 of the tapered waveguide 104 such that the width of exited (asymmetric or elliptical) beam 210 matches a width of the grating coupler 224 of the slider 209.

In a particular embodiment, the grating coupler 224 can be etched into the core layer 218 from the top dielectric layer 220. The grating coupler 224 can have a periodicity of 750 nm and can have an etch depth of approximately 100-nm with substantially rectangular groove (etch) profiles with 50% duty cycle (i.e., a width of approximately 350 nm). In a particular embodiment, the grating coupler 224 in the slider 209 could be blazed and/or chirped to achieve good light delivery efficiency. In a particular example, the grating coupler 224 includes a plurality of parallel grooves or ridges that extend in a direction that is substantially parallel to a plane of the recording medium 120. The elliptical beam 210 is focused onto the grating, which is polarized. The polarization of the grating coupler 224 can be perpendicular to the grooves of the grating for transmission of the transverse mode (TM) in the slider waveguide 212. In a particular example, the elliptical beam 210 is focused to an area that is approximately equal to an area of the grating coupler 224.

Further, by including a mirror layer 214 in the slider 209 and by controlling a thickness of the bottom dielectric layer 216 between the mirror layer 214 and the core 218, good coupling efficiency can be achieved. In a particular example, the top dielectric layer 220 has an index of refraction of $n_{top}=1.65$, and the core layer 218 has an index of refraction of $n_{core}=2.15$. In this particular example, the thickness of the bottom dielectric (cladding) layer 216 can be selected to yield good grating coupling efficiency. In a particular example, the grating coupling efficiency is designed to be approximately 820 nm.

In a particular embodiment, the PSIM 228 has an opening of approximately 50 μm. The PSIM 228 provides good tolerance in positioning the tapered waveguide 104 on the slider 209 in the Y-direction. In a particular example, the size of the asymmetric beam 210 that is incident on the grating coupler 224 in the Z-direction is determined by the mode confinement of the tapered waveguide 104 in a direction normal to the waveguide plane and by the distance from the output of the tapered waveguide 104 to the grating coupler 224. In a particular embodiment, the size of the asymmetric beam 210 can be confined to be less than 10 μm to allow good angular tolerance for coupling the asymmetric beam 210 to the core layer 218 of the slider waveguide 212 (as represented by the light beam 226) and in positioning of the tapered waveguide 104 on the slider 209.

In a particular embodiment, a distance, d, between the end portion 114 of the tapered waveguide 104 and the grating coupler 224 is determined by the angular divergence of the beam 210 in a direction normal to the plane of the tapered waveguide and the grating length (along the Z-direction) in a slider 209. In a particular embodiment, due to this divergence, it can be desirable to limit this distance d according to the following equation:

$$d=\lambda/NA^2 \quad \text{(Equation 1)}$$

Here the variable (λ) denotes the wavelength of light in free space and the variable (NA) is the numerical aperture of the tapered waveguide, which describes the angular divergence of beam 210 along Z-direction. The transverse position of the tapered waveguide 104 on the slider 209 can be adjusted along the X-direction to yield good light delivery efficiency before the tapered waveguide 104 is fixed to the overcoat layer 222 of the slider 209.

In a particular non-limiting example, the tapered waveguide 104 has a substantially square optically transparent core 202 (in cross-section) of approximately 4.16 μm by 4.16 μm, and the dielectric layers 204 and 206 have an index of refraction of approximately n=1.5. In this example, the index of refraction of the optically transparent core 202 approximately n=1.52. The propagated light 112 has a wavelength (λ) of 0.83 μm. In this example, the fundamental mode of the tapered waveguide 104 has an effective index $n_{eff}=1.5186$ and the full-width-at-half-maximum (FWHM) intensity of approximately 2.61 μm. Using a 1 mm long taper that expands from 4.16 μm to 30.16 μm along its length ($L_t$) in the tapered waveguide 104 and by designing the grating coupler 224 for the asymmetric beam 210, tolerances can be significantly improved. In a particular example, the asymmetric beam 210 is incident on the grating coupler 224 with a size aspect ratio having a range from approximately 3 to 1 to approximately 5 to 1. By allowing for the asymmetric beam 210, the grating coupler 224 provides enhanced wavelength and position tolerance. Further, by using the wedged mirror 208 and by employing a grating coupler 224 that is designed to couple an asymmetric beam 210 into the slider waveguide 212, there is no need for further beam shaping optics, thereby providing enhanced light coupling with reduced fabrication costs.

Figure 3:
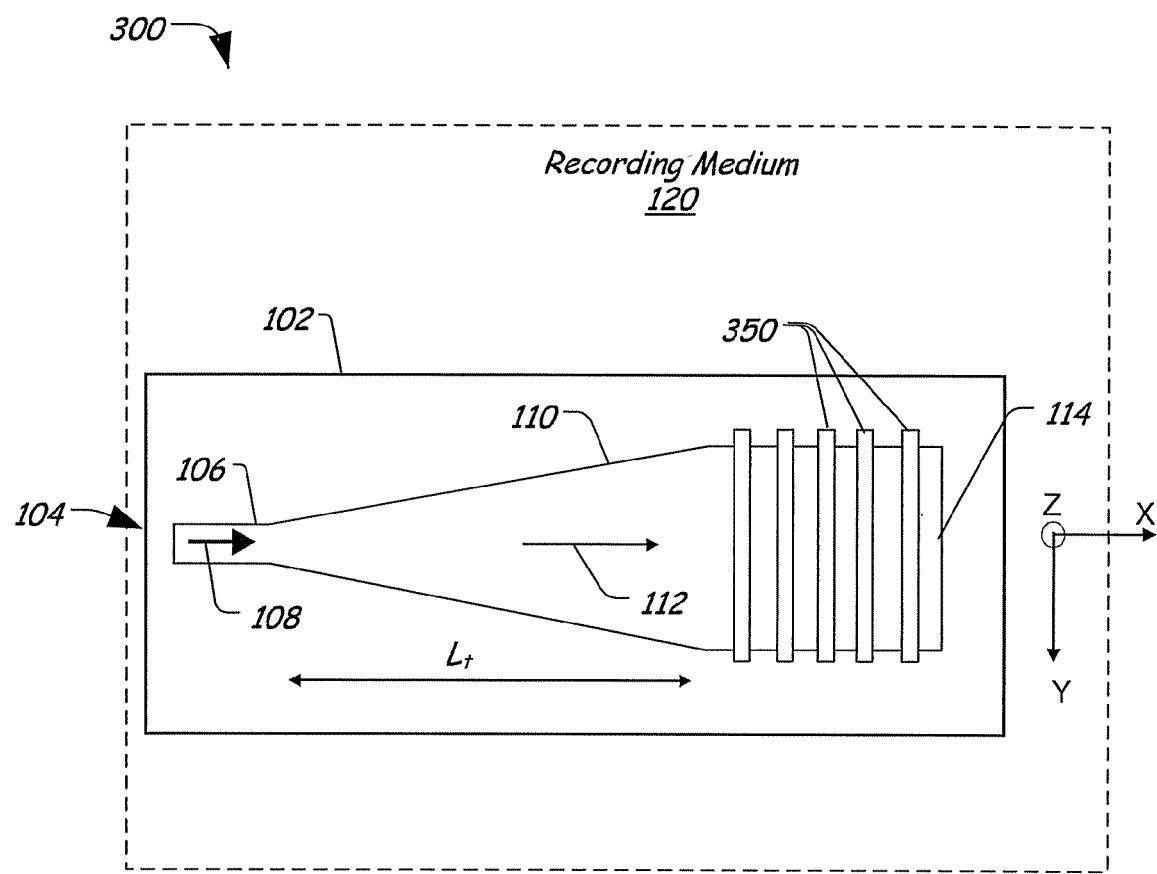
FIG. 3 is a top view of a particular illustrative embodiment of a recording head including a channel waveguide having a tapered portion to expand a propagating beam of light and an output grating.

FIG. 3 is a top view of a particular illustrative embodiment of a system 300 including the recording head 102 that has the tapered waveguide 104. The recording head 102 extends over the recording medium 120. The tapered waveguide 104 includes a channel waveguide portion 106 that propagates light from a light source to a tapered waveguide portion 110, which operates as a beam expander to expand the light 112 as it approaches an end portion 114 of the tapered waveguide 104. The waveguide 104 includes an output grating 350.

In a particular embodiment, a mirror (not shown) similar to that in the slider waveguide, illustrated in FIG. 2, may be implemented on the output grating 350. Light in the tapered waveguide 104 may propagate from either the channel waveguide portion 106 or the end portion 114 to the output grating 350. For light propagating from the end portion 114, a high coupling efficiency (over 95%) can be achieved from the tapered channel waveguide 104 to the slider waveguide (slider waveguide 212 illustrated in FIGS. 2 or 4). The combination of the output grating 350 and a corresponding grating coupler 224 (illustrated in FIGS. 2 and 4) yields a robust coupling that is tolerant relative to environmental changes.

In a particular example, the tapered waveguide portion 110 has a length (Lt) over which the width of the tapered waveguide 104 is expanded to provide the beam expansion. In a particular example, the linear taper has a thickness of approximately 4.16 μm and a width of approximately 4.16 μm at a junction between the channel waveguide portion 106 and the tapered waveguide portion 110. In this example, the linear taper expands to a width of approximately 30.16 μm at the end portion 114 over the length (Lt) of approximately 1 mm.

Figure 4:
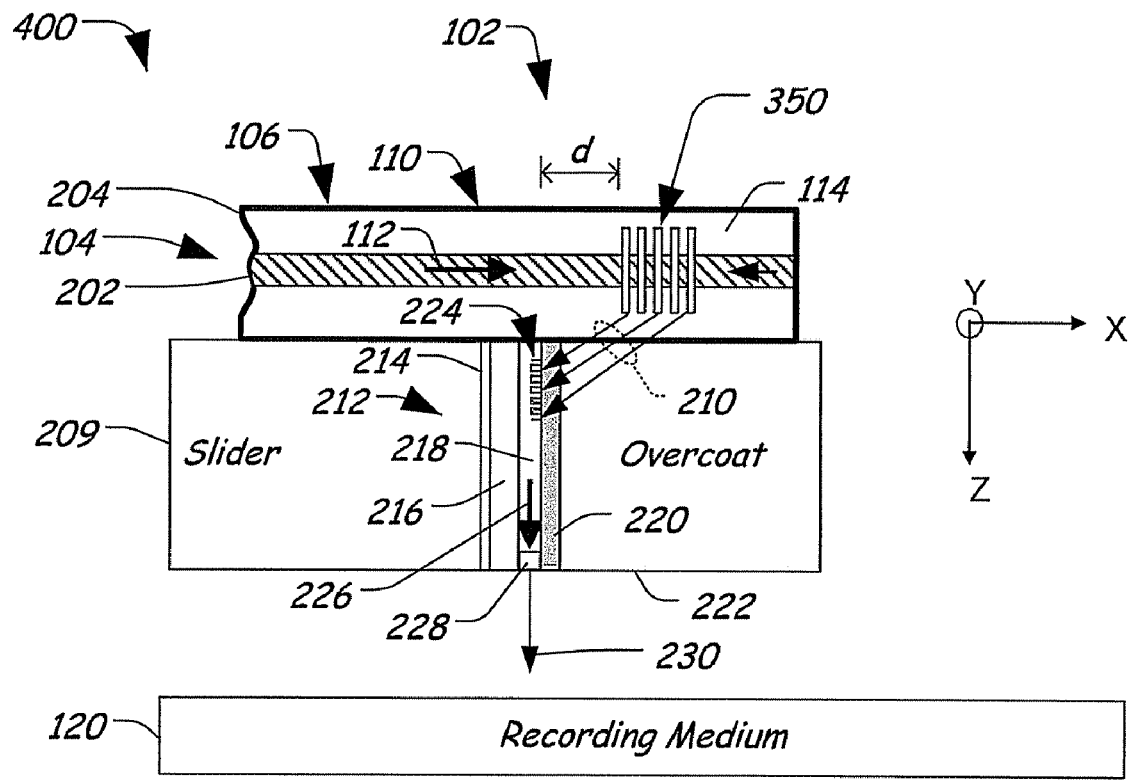
FIG. 4 is a block diagram of a system including a cross-sectional view of the recording head illustrated in FIG. 3, which recording head includes a slider waveguide having a grating coupler to receive an elliptical beam from the output grating and a solid immersion mirror to focus light onto a surface of a recording medium.

FIG. 4 is a block diagram of a system 400 including a cross-sectional view of the recording head 102 illustrated in FIG. 3, which recording head 102 includes the tapered waveguide 104. The tapered waveguide 104 includes an optically transparent core 202 sandwiched between dielectric layers 204 and 206. The waveguide core 202 propagates light 112 toward the end portion 114 of the tapered waveguide 104 and is directed out of the tapered waveguide 104 via the output grating 350 and onto the slider 209 that includes the grating coupler 224. Alternatively, light can propagate from the end portion 14 toward the output grating 350 that directs the light (with high efficiency) onto the grating coupler 224 of the slider 209.

The light beam 210 exiting from the tapered waveguide 104 has a substantially elliptical shape. In a particular embodiment, a mirror (not shown) similar to that in the slider waveguide, illustrated in FIG. 2, may be implemented on the output grating 350 to further direct the light beam onto the grating coupler 224.

The slider waveguide 212 in a region proximate to the grating coupler 224 includes a mirror layer 214, a bottom dielectric layer 216, the optically transparent core 218, a top dielectric layer 220, and a thick dielectric overcoat layer 222. In a particular non-limiting example, the mirror layer 214 is formed from gold (Au), and the bottom and top dielectric layers 216 and 220 are formed of Al2O3. In this particular example, the optically transparent core layer 218 is approximately 125-nm thick and made from Ta2O5. In this example, the overcoat layer 222 has a thickness of approximately 20 μm. In a particular embodiment, the tapered waveguide can be coupled to the overcoat layer 222 of the slider 209 by ultraviolet (UV) curing.

The grating coupler 224 is adapted to couple the asymmetric beam 210 into a waveguide core 218 of the slider waveguide 212. The coupled beam is represented as a light beam 226, which propagates along the waveguide core 218 to a focusing element, such as a planar solid immersion mirror (PSIM) 228. The PSIM 228 can include a parabolic element to condense the light beam 226 into a focused beam 230, which can be directed onto a surface of the recording medium 120. In a particular example, the focused beam 230 can locally heat the surface of the recording medium 120 to facilitate heat-assisted magnetic recording, for example, in conjunction with a magnetic field.

In a particular embodiment, the grating coupler 224 can be etched into the core layer 218 from the top dielectric layer 220. The grating coupler 224 can have a periodicity of 750 nm and can have an etch depth of approximately 100-nm with substantially rectangular groove (etch) profiles with 50% duty cycle (i.e., a width of approximately 350 nm). In a particular embodiment, the grating coupler 224 in the slider 209 could be blazed and/or chirped to achieve good light delivery efficiency. In a particular example, the grating coupler 224 includes a plurality of parallel grooves or ridges that extend in a direction that is substantially parallel to a plane of the recording medium 120. The elliptical beam 210 is focused onto the grating, which is polarized. The polarization of the grating coupler 224 can be perpendicular to the grooves of the grating for transmission of the transverse mode (TM) in the slider waveguide 212. In a particular example, the elliptical beam 210 is focused to an area that is approximately equal to an area of the grating coupler 224.

Further, the output grating 350 can be similarly produced on the tapered waveguide by etching a plurality of parallel grooves or ridges in the dielectric layer 206 and at a desired coupling mode to direct the propagating beam 112 onto the grating coupler 224.

Figure 5:
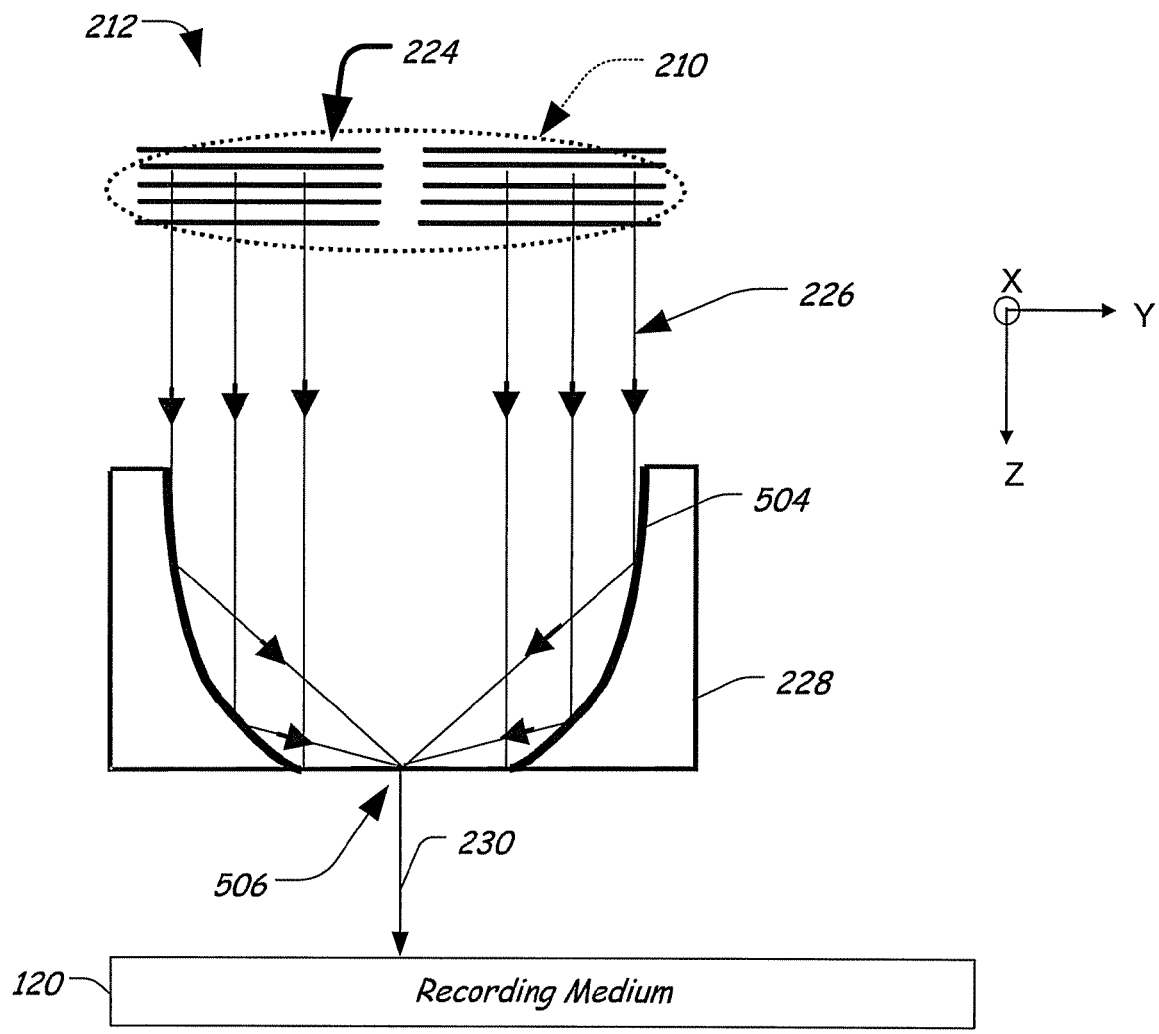
FIG. 5 is a cross-sectional block diagram of a portion of the slider waveguide, illustrated in FIGS. 2 and 4, including solid-immersion mirror having parabolic sidewalls.

FIG. 5 is a cross-sectional block diagram of the slider waveguide 212 illustrated in FIGS. 2 and 4, including solid-immersion mirror 228 having parabolic sidewalls 304. The slider waveguide 212 is associated with a grating coupler 224 adapted to couple the asymmetric beam 210 into the waveguide 212 (as illustrated by the coupled light beams 226). The coupled light beams 226 are reflected by the parabolic sidewalls 504 of the planar solid immersion mirror (PSIM) 228 to an opening 506, forming a focused beam 230 that is directed onto a surface of the recording medium 120.

Figure 6:
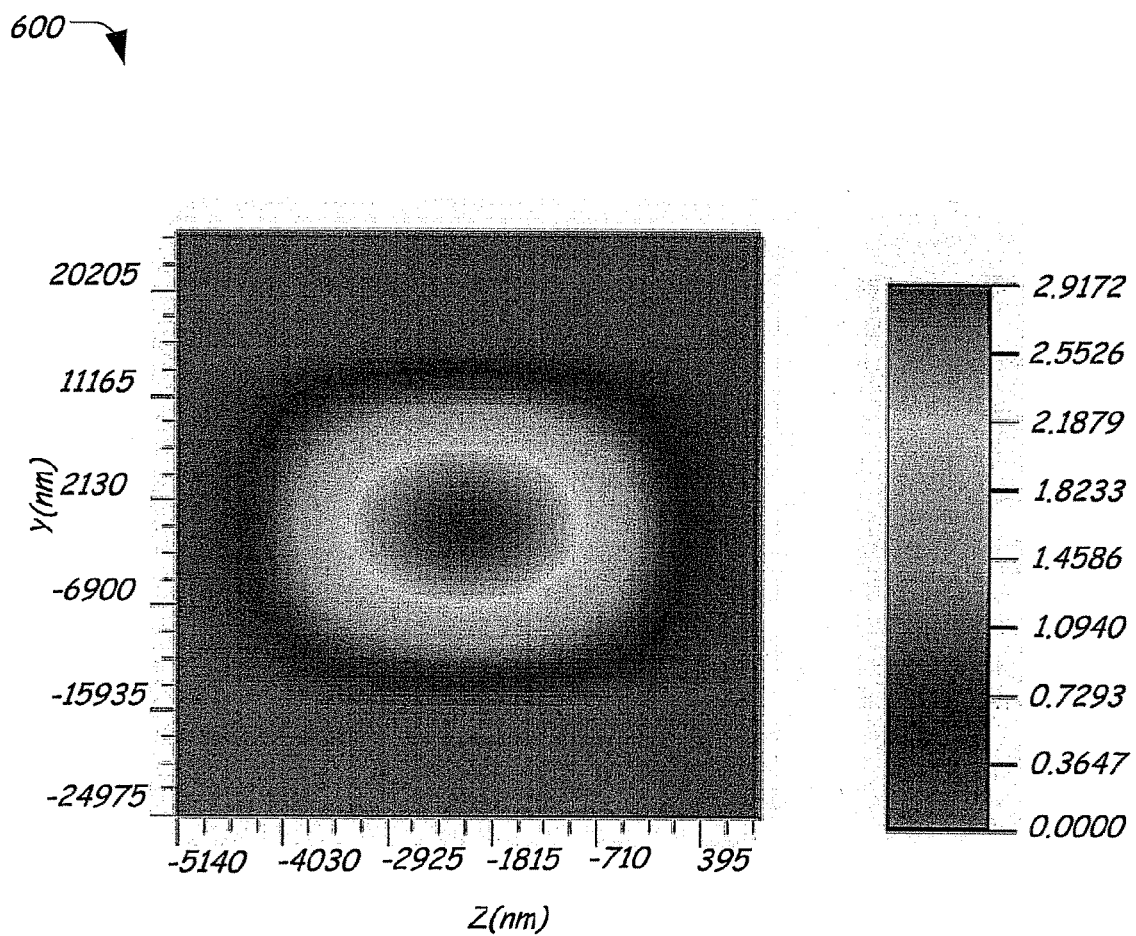
FIG. 6 is a graph of a particular illustrative embodiment showing the light beam intensity profile in a YZ plane in nanometers at a distance of five (5) micrometers from the end of an optical waveguide taper to a grating associated with the slider waveguide.

FIG. 6 is a graph 600 of a particular illustrative embodiment of light beam in a Y-direction and Z-direction in nanometers at a distance of five (5) micrometers from the end of an optical waveguide taper to the grating coupler. In this particular example, the optically transparent core of the tapered waveguide is approximately 4.16 μm by 4.16 μm (in cross section) and expands to approximately 30.16 μm along a taper length ($L_t$) of 1 mm. At this distance, the asymmetrical beam has a substantially Gaussian profile.

Figure 7:
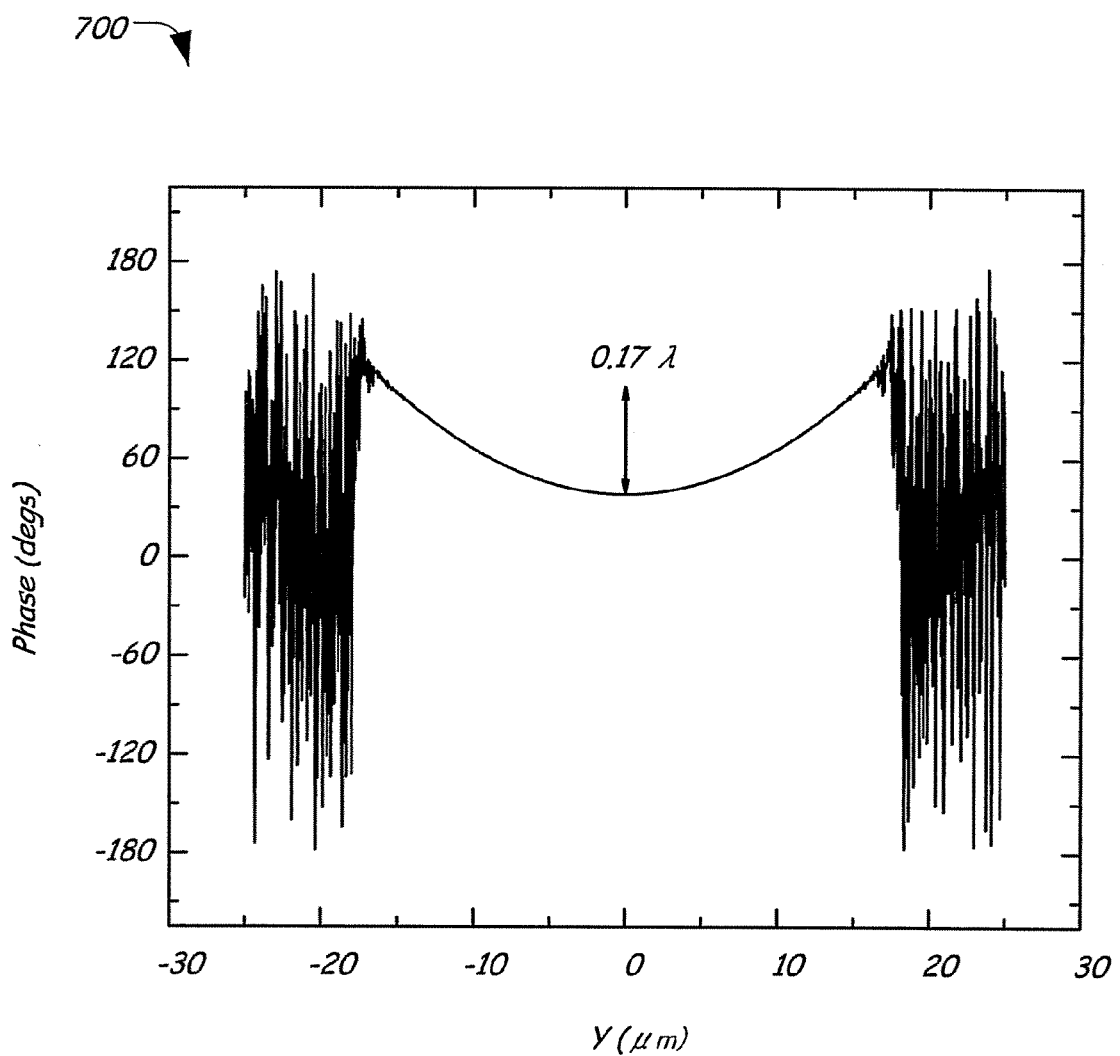
FIG. 7 is a graph of a particular illustrative embodiment showing the phase in degrees versus distance in a Y-direction in micrometers for the light beam of FIG. 6.

FIG. 7 is a graph 700 of a particular illustrative embodiment of phase in degrees versus distance in a Y-direction in micrometers for the light beam of FIG. 6. As shown, at this distance, the beam wave front has a peak-to-valley phase variation of approximately 0.17λ. In a particular example, the phase variation can be reduced if a longer taper is used.

Figure 8:
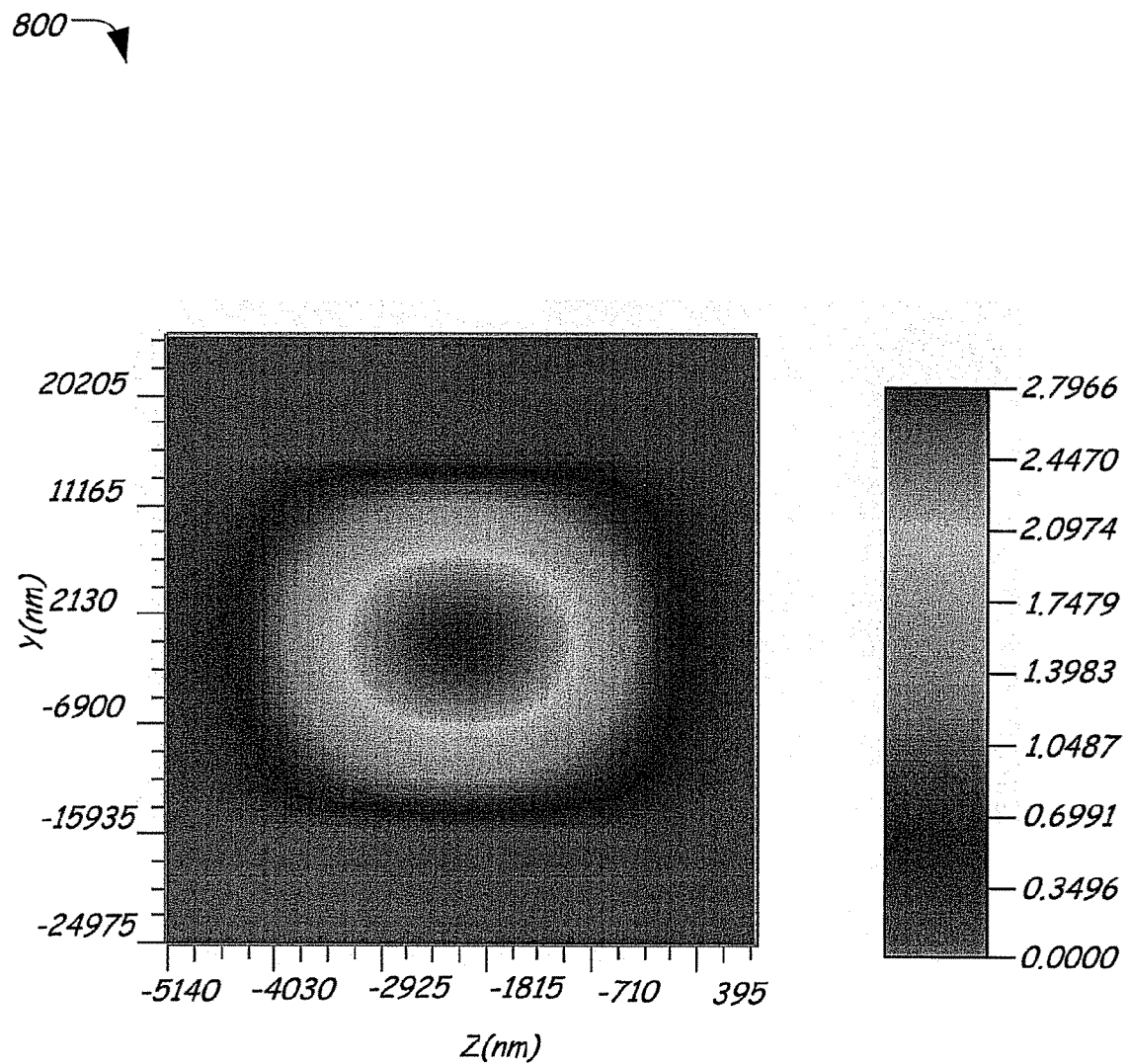
FIG. 8 is a graph of a particular illustrative embodiment showing the light beam intensity profile in a YZ plane in nanometers at a distance of one hundred five (105) micrometers from the end of an optical waveguide taper.

FIG. 8 is a graph 800 of a particular illustrative embodiment of light beam intensity profile in a Y-direction and Z-direction in nanometers at a distance of one hundred five (105) micrometers from the end of an optical waveguide taper to the grating coupler. After propagating approximately 105 μm, the beam shape changes little and continues to have a Gaussian profile.

Figure 9:
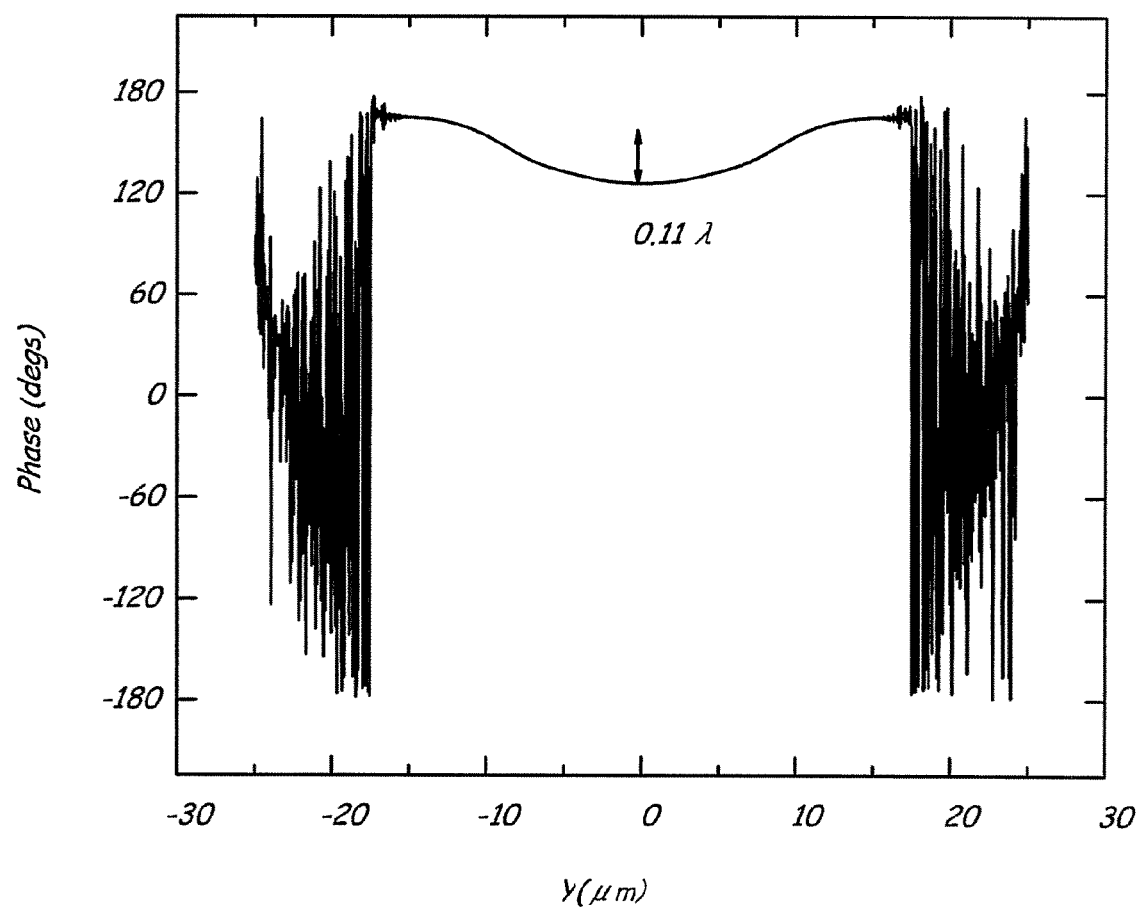
FIG. 9 is a graph of a particular illustrative embodiment showing the phase in degrees versus distance in a Y-direction in micrometers for the light beam of FIG. 8.

FIG. 9 is a graph 900 of a particular illustrative embodiment of phase in degrees versus distance in a Y-direction in micrometers for the light beam of FIG. 8. As shown, at the distance of 105 μm, the beam has a peak-to-valley phase variation of approximately 0.11λ.

Figure 10:
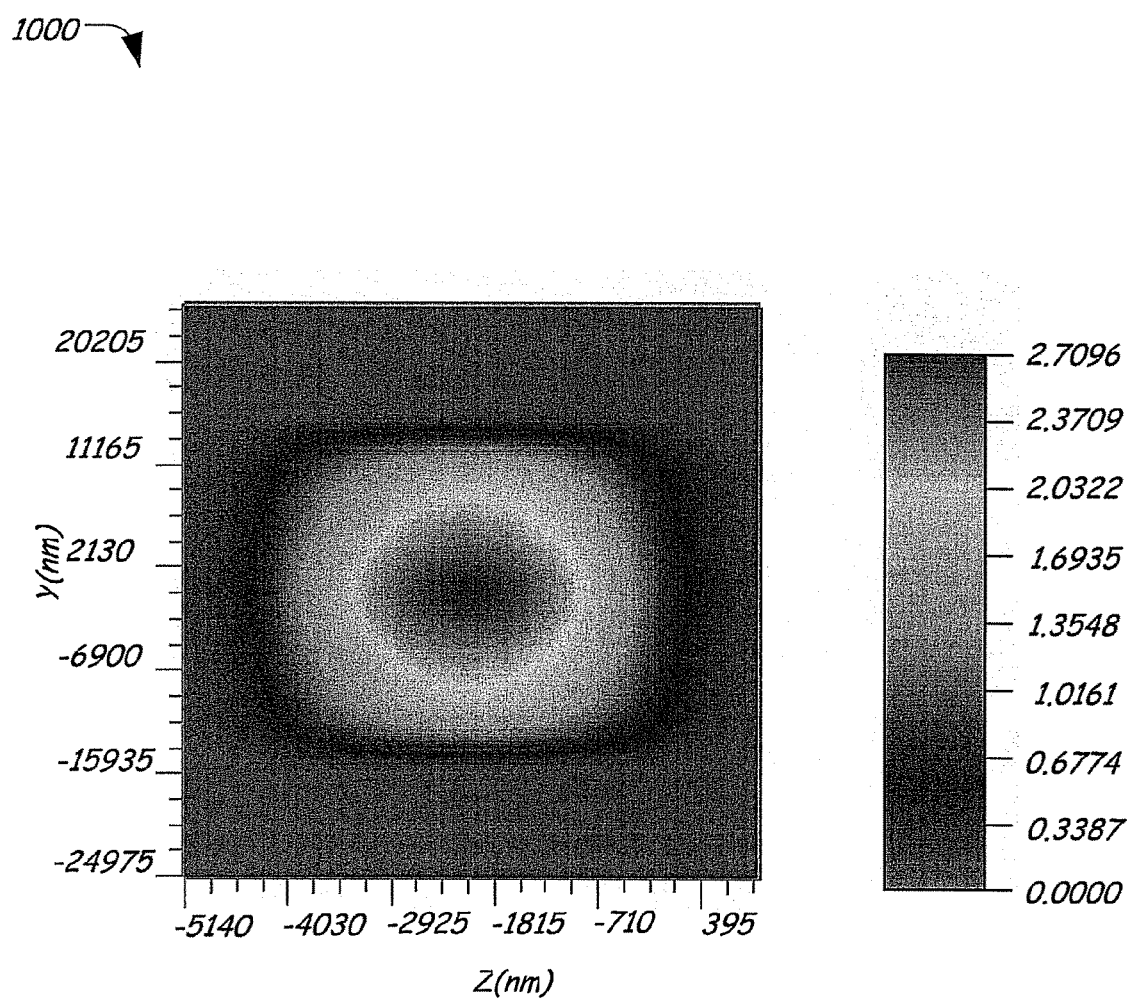
FIG. 10 is a graph of a particular illustrative embodiment showing the light beam intensity profile in a YZ plane in nanometers at a distance of two hundred five (205) micrometers from the end of an optical waveguide taper.

FIG. 10 is a graph 1000 of a particular illustrative embodiment of light beam intensity profile in a Y-direction and Z-direction in nanometers at a distance of two hundred five (205) micrometers from the end of an optical waveguide taper to the grating coupler. In this example, the beam shape changes slightly, becoming slightly larger and more rectangular in shape.

Figure 11:
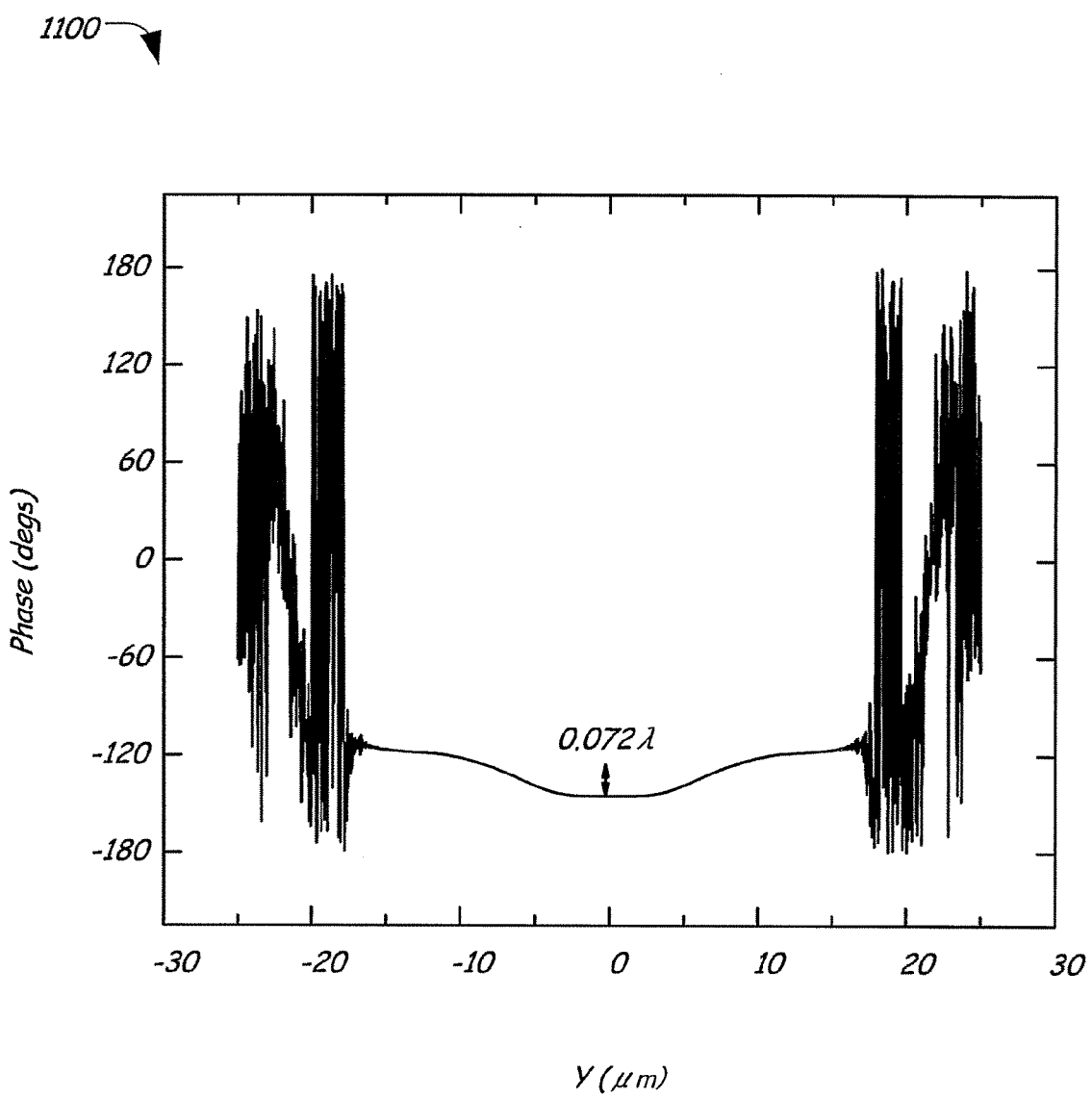
FIG. 11 is a graph of a particular illustrative embodiment showing the phase in degrees versus distance in a Y-direction in micrometers for the light beam of FIG. 10.

FIG. 11 is a graph 1100 of a particular illustrative embodiment of phase in degrees versus distance in a Y-direction in micrometers for the light beam of FIG. 10. As shown, at the distance of 205 μm, the peak-to-valley phase becomes 0.072λ.

Figure 12:
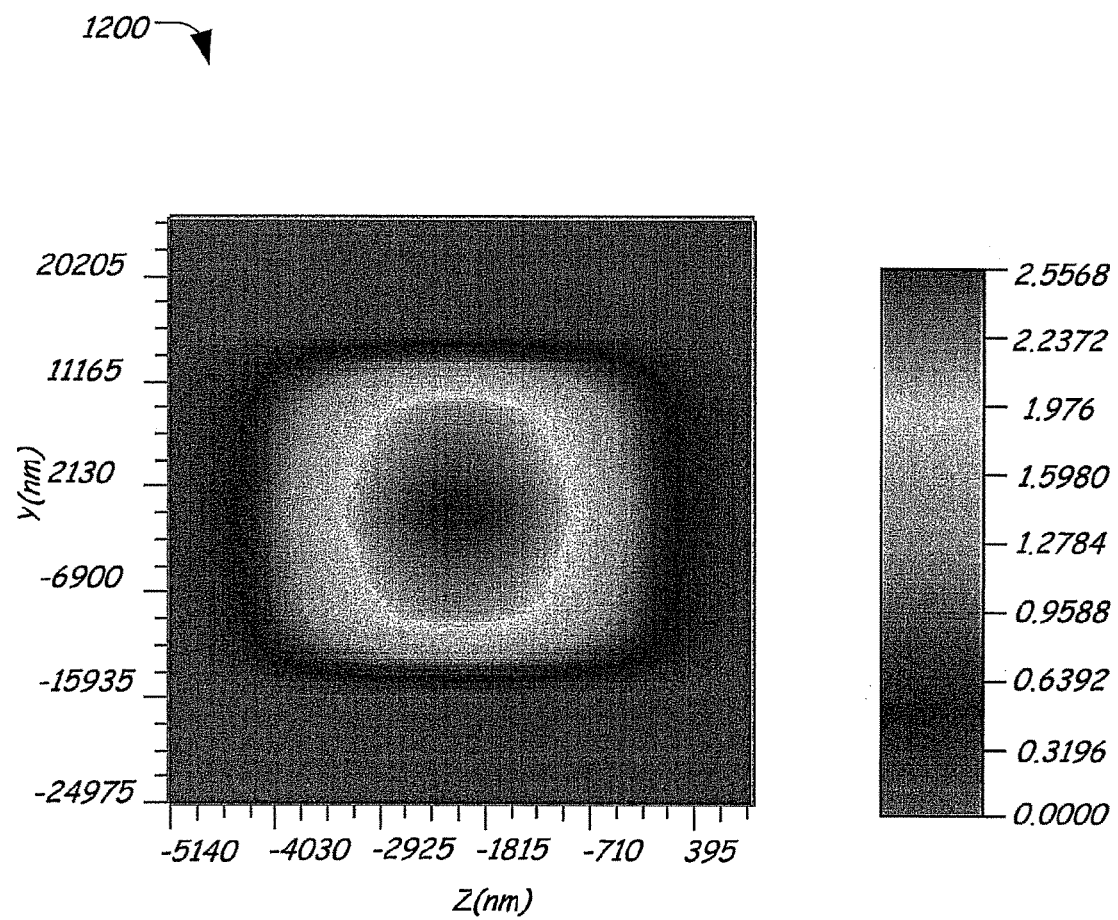
FIG. 12 is a graph of a particular illustrative embodiment showing the light beam intensity profile in a YZ plane in nanometers at a distance of three hundred five (305) micrometers from the end of an optical waveguide taper.

FIG. 12 is a graph 1200 of a particular illustrative embodiment of light beam intensity profile in a Y-direction and Z-direction in nanometers at a distance of three hundred five (305) micrometers from the end of an optical waveguide tape to the grating coupler. The FWHM of the beam at x=305 μm is 2.634 μm in a direction that is normal to the waveguide plane (i.e., in the Z-direction) and 20.851 μm along Y-direction on the waveguide plane.

Figure 13:
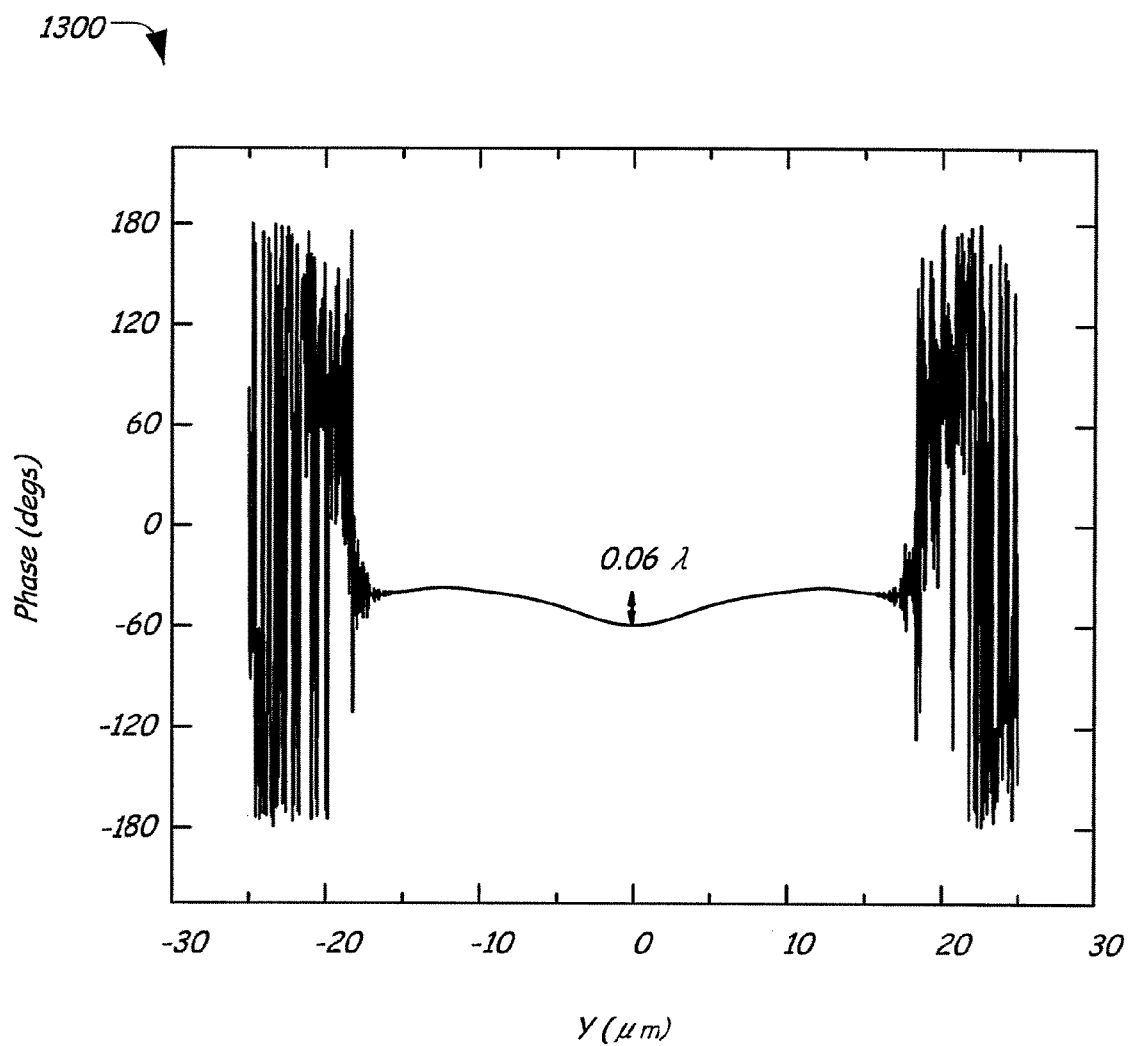
FIG. 13 is a graph of a particular illustrative embodiment showing the phase in degrees versus distance in a Y-direction in micrometers for the light beam of FIG. 12.

FIG. 13 is a graph 1300 of a particular illustrative embodiment of phase in degrees versus distance in a Y-direction in micrometers for the light beam of FIG. 12. As shown, at the distance of 305 μm, the peak-to-valley phase becomes 0.06λ.

Figure 14:
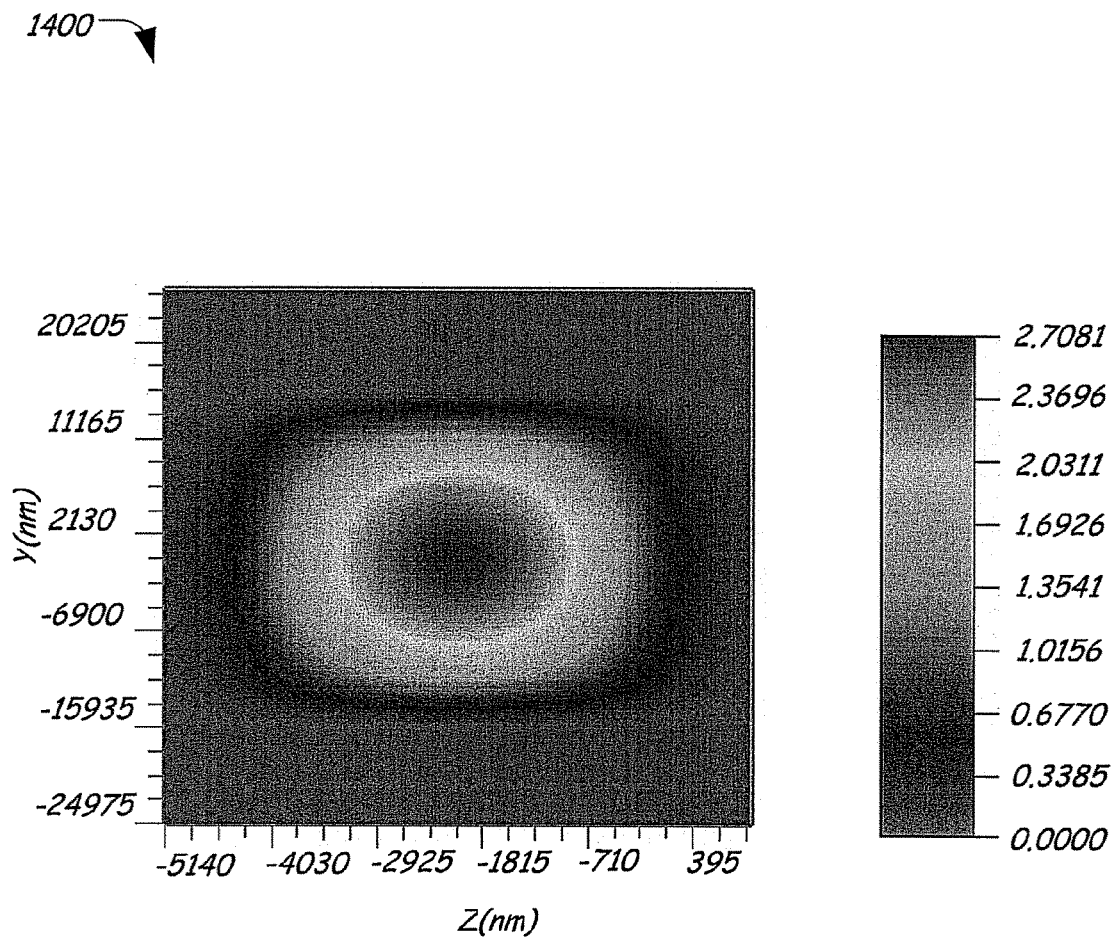
FIG. 14 is a graph of a particular illustrative embodiment showing the light beam intensity profile in a YZ plane in nanometers of the light beam leaving a tapered optical waveguide having a core width of 4.16 µm, a taper length ($L_t$) of 1 mm, and an end taper width of 30.16 µm.

FIG. 14 is a graph 1400 of a particular illustrative embodiment of light beam intensity profile in a Y-direction and Z-direction in nanometers for a light beam leaving a parabolic tapered optical waveguide. In this particular example, the width of the parabolic horn along the propagation direction (i.e., in the X-direction) is given by the following equation:

$$W(x)^2 = W_0^2 + 2\alpha\lambda_g x \quad \text{(Equation 2)}$$

In Equation 2, the variable ($\alpha$) is a constant that is less than unity, the variable ($W_0$) is the core width of the tapered waveguide, and the variable ($\lambda_g$) represents a wavelength of the light propagating in the slider waveguide, where the wavelength ($\lambda_g$) is determined according to the following equation:

$$\lambda_g = \lambda/n_{\textit{eff}} \qquad \text{(Equation 3)}$$

In this example, the wavelength ($\lambda$) denotes a wavelength of light in free space and the variable ($n_{\textit{eff}}$) stands for the effective index of refraction of the waveguide mode. In this instance, the graph 1400 illustrates an intensity profile of the beam exiting from a parabolic taper of $W_0$=4.16 μm, $W_1$=30.16 μm, $L_t$=1 mm. It is evident that the beam exiting from the taper is Gaussian-like.

Figure 15:
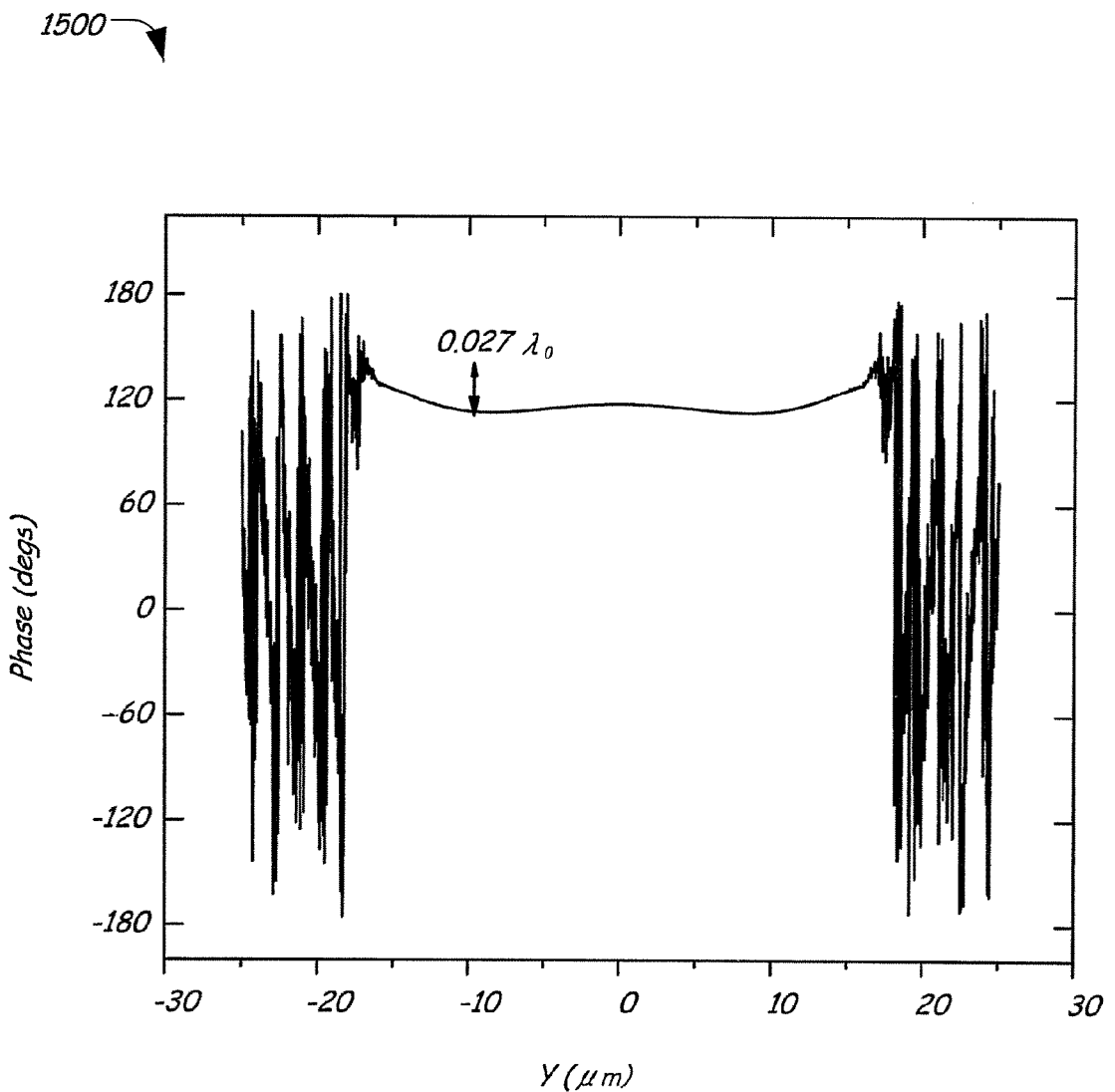
FIG. 15 is a graph of a particular illustrative embodiment showing the phase variation in degrees versus distance in a Y-direction in micrometers at the exit of a parabolic taper.

FIG. 15 is a graph 1500 of a particular illustrative embodiment of phase variation in degrees versus distance in a Y-direction in micrometers at an exit to the parabolic taper of FIG. 14. As shown, the graph 1500 demonstrates an almost flat phase wave front having a peak-to-valley variation of only $0.027\lambda_g$.

Figure 16:
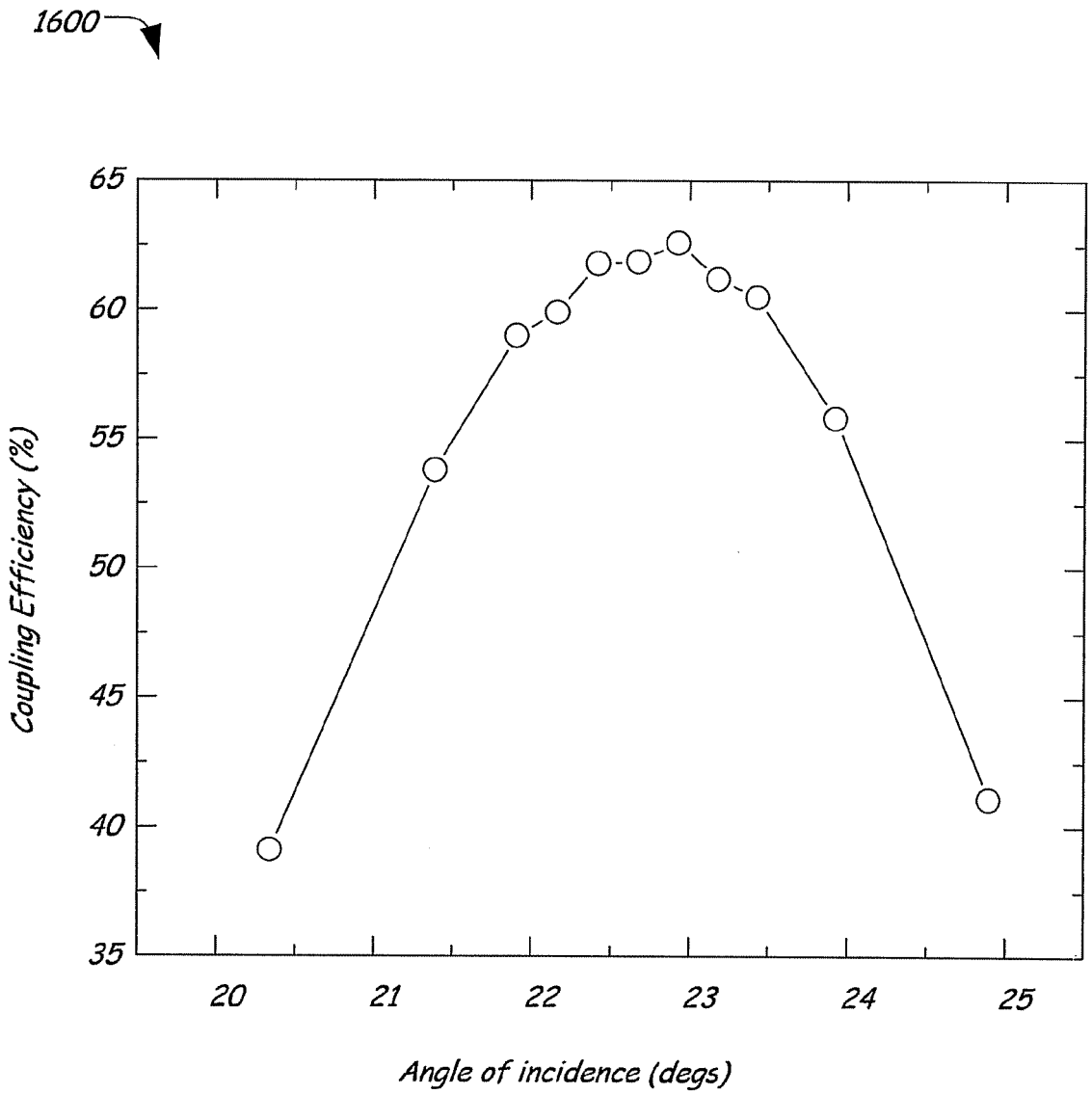
FIG. 16 is a graph of a particular illustrative embodiment of grating coupling efficiency as a function of angle of incidence from normal to a grating that optically couples the light from the tapered waveguide to the slider waveguide.

FIG. 16 is a graph 1600 of a particular illustrative embodiment of grating coupling efficiency as a function of angle of incidence from the normal (i.e., in the X-direction) of a grating that optically couples the tapered waveguide to the slider waveguide. In this example, the beam exits from the tapered waveguide by an end-mirror and illuminates the input grating in a heat-assisted magnetic recording slider, such as the slider 208 illustrated and described above with respect to FIG. 2. The graph 1600 is based on a particular example of a slider waveguide having a grating coupler region that includes a gold mirror layer, a bottom $Al_2O_3$ dielectric layer, a 125-nm thick $Ta_2O_5$ core layer, a top $Al_2O_3$ dielectric layer, and a thick dielectric overcoat layer (approximately 20 μm). In this example, the grating coupler is etched into the core layer from the top $Al_2O_3$ dielectric layer. The grating coupler has a periodicity of 750 nm and is 100 nm deep, having rectangular groove profiles with 50% duty cycle. In this instance, the thickness of the bottom cladding ($Al_2O_3$ dielectric) layer can be selected to provide good grating coupling efficiency, which is set to be 820 nm. The graph 1600 shows that the grating coupling efficiency is between 62% and 40% if the angle of incidence is ±2.2° from a desired value, which exhibits good angular tolerance in alignment.

Figure 17:
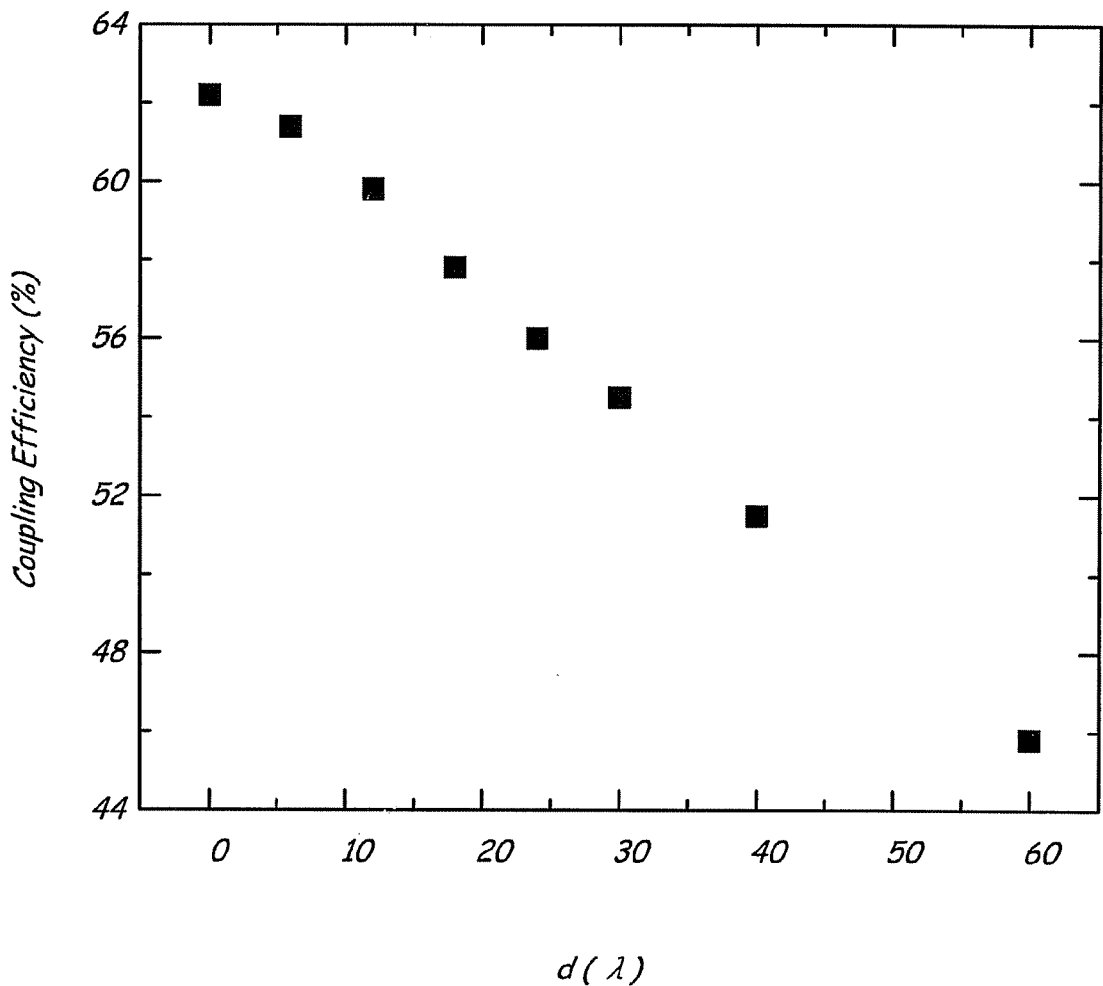
FIG. 17 is a graph of a particular illustrative embodiment of grating coupling efficiency as a function of a distance between the end of the flexible waveguide and the grating plane.

FIG. 17 is a graph 1700 of a particular illustrative embodiment of grating coupling efficiency as a function of a distance between the end of the tapered waveguide and the grating plane. Since the beam exiting from the tapered waveguide is divergent, particularly in the direction normal to the grating lines (i.e., in the Z-direction), the phase variation along the grating lines eventually decreases the grating coupling efficiency with increasing distance.

Assuming that the exited beam propagates in free space, the peak phase of the beam can be determined from the following equation:

$$\phi_{Peak} = \frac{d}{\pi\lambda}\left(\frac{\lambda}{w_0}\right)^2 \qquad \text{(Equation 4)}$$

In the example of Equation 4, the variable (d) represents a distance between the end of the tapered waveguide (i.e., the end portion 114 illustrated in FIGS. 1 and 2) and the grating plane (i.e., the grating coupler 224 illustrated in FIGS. 2 and 3). Alternatively, the variable (d) can represent a distance between an output grating of the tapered waveguide (i.e., the output grating 350 illustrated in FIGS. 3 and 4) and the grating plane (i.e., the grating coupler 224 illustrated in FIGS>3 and 4). Further, the variable ($w_0$) represents a 1/$e^2$ radius of the beam intensity at the end portion 114 or at the output grating 350 of the tapered waveguide 104 (illustrated in FIGS. 1 and 3), depending on the implementation. The variable ($w_0$) is related to the full-width-at-half-maximum (FWHM) intensity of the beam according to the following equation:

$$w_0 = \frac{FWHM}{\sqrt{2\ln 2}} \qquad \text{(Equation 5)}$$

In a particular example, the distance (d) is approximately 24 μm for a peak-to-valley phase variation of approximately $0.2\lambda$ in the peak phase.

The graph 1700 illustrates that the coupling efficiency is not particularly sensitive to the distance. At a distance of d=50 μm, the coupling efficiency decreases from 62% to 46%, assuming that the beam position in the Z-direction relative to the grating edge is optimized within a tolerance of approximately 2 μm.

Figure 18:
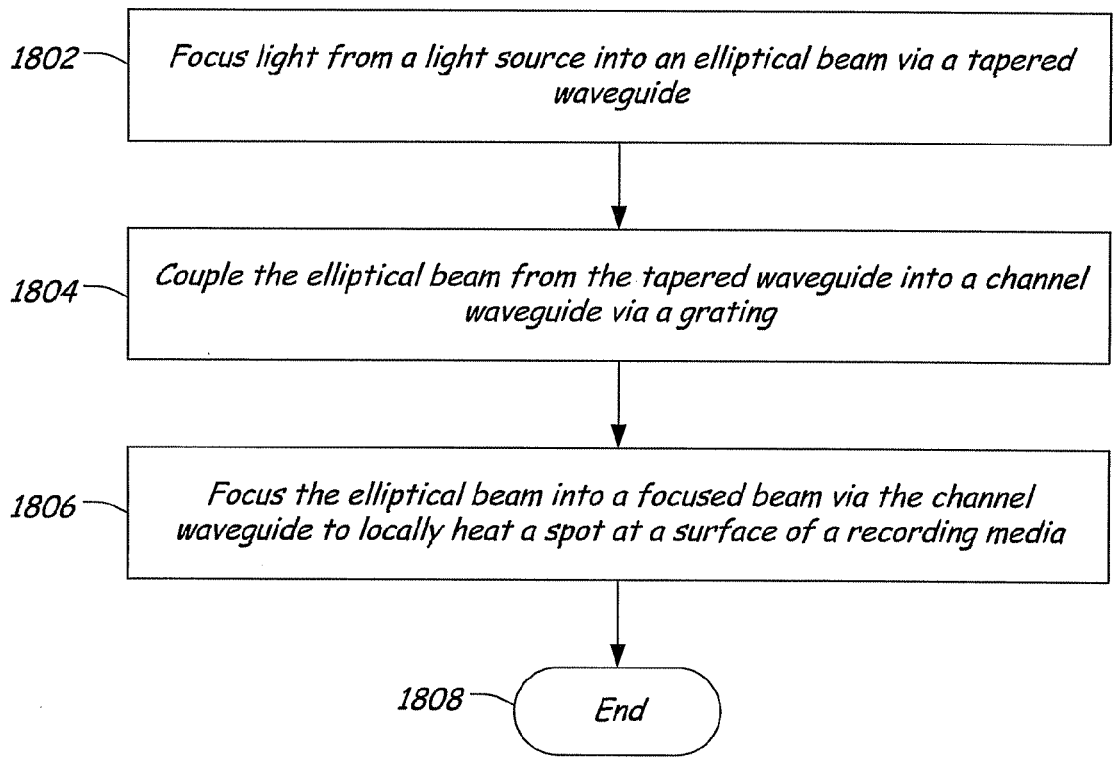
FIG. 18 is a block diagram of a particular illustrative embodiment of a method of delivering light to a recording media.

FIG. 18 is a block diagram of a particular illustrative embodiment of a method of delivering light to a recording media. At 1802, light from a light source is delivered via a tapered waveguide into an elliptical beam. In a particular embodiment, the tapered waveguide includes a waveguide taper for beam expansion in the waveguide plane and a mirror adapted to direct the light out of the tapered waveguide. The waveguide taper is designed without substantially reducing mode purity and without causing wavefront distortion. Continuing to 1804, the elliptical beam from the tapered waveguide is coupled into a slider waveguide via a grating. In a particular embodiment, the elliptical beam is directed onto the grating and has a spot size at the grating that is approximately equal to a size of the grating. In a particular example, the grating is adapted to couple the elliptical beam to the slider waveguide. Advancing to 1806, the light beam propagating in the slider waveguide is focused via a solid immersion mirror to locally heat a recording media. The method terminates at 1808.

In a particular embodiment, the method further includes applying a magnetic field to the spot at the recording media to record data to the recording media. In a particular example, the grating is adapted to couple the elliptical beam to the slider waveguide with good optical alignment tolerance.

Figure 19:
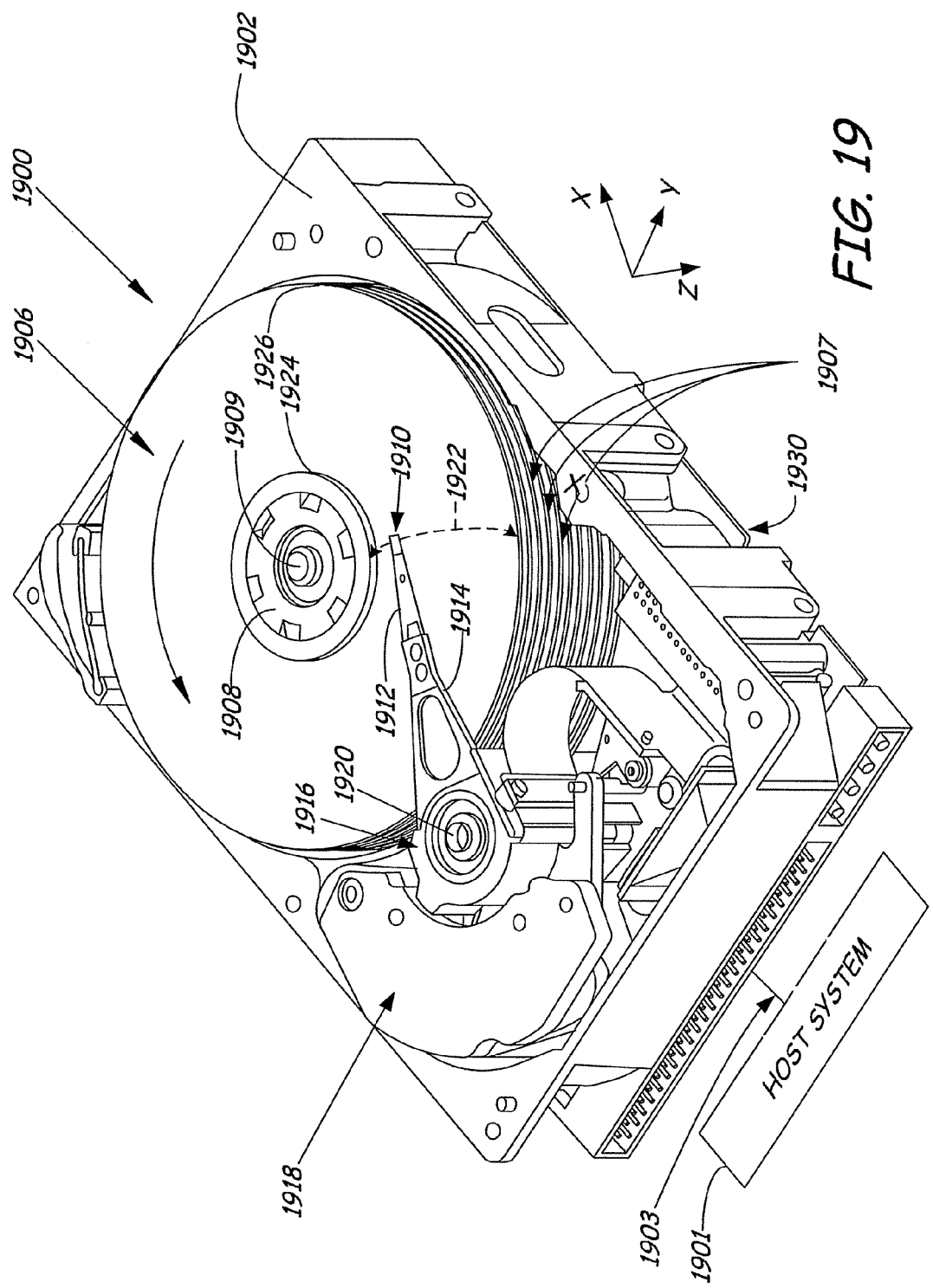
FIG. 19 is an isometric view of a disc drive adapted for heat-assisted magnetic recording and including a recording head, such as the recording head illustrated in FIGS. 1-4, that is mounted to a slider.

FIG. 19 is an isometric view of a disc drive 1900 adapted to communicate with a host system 1901 via an interface 1903. The disc drive 1900 includes a housing with a base 1902 and a top cover (not shown). The disc drive 1900 further includes a disc pack 1906, which includes a plurality of individual discs 1907 that are mounted for co-rotation about central axis of a spindle 1909 by a disc clamp 1908. Each disc surface has an associated disc head slider 1910 which is mounted to disc drive 1900 for communication with the disc surface. The sliders 1910 include a slider waveguide with a grating coupler, such as the slider waveguide 212 and the associated grating coupler 224 illustrated in FIGS. 2 and 4, which are adapted to receive propagated light from a tapered waveguide including an end portion having a wedged mirror, such as the tapered waveguide 104 illustrated in FIGS. 1 and 2 and the tapered waveguide 304 including an output grating 350 illustrated in FIGS. 3 and 4. The sliders 1910 may also have an associated field-generating component, such as a magnetic read/write head, for recording data to locally heated areas of the discs 1907.

In the example shown in FIG. 19, sliders 1910 are supported by suspensions 1912 which are in turn attached to track accessing arms 1914 of an actuator 1916. The actuator shown in FIG. 19 is of the type known as a rotary moving coil actuator and includes a voice coil motor (VCM), shown generally at 1918. Voice coil motor 1918 rotates actuator 1916 with its attached heads 1910 about a pivot shaft 1920 to position heads 1910 over a desired data track along a path 1922 between a disc inner diameter 1924 and a disc outer diameter 1926. Voice coil motor 1918 is driven by servo electronics 1930 based on signals generated by heads 1910 and a host system 1901.

In a particular embodiment, the plurality of discs 1907 have a relatively high coercivity and are magnetically recordable using heat. The slider waveguides associated with the sliders 1910 are adapted to locally heat selected areas on the surfaces of the discs 1907 to facilitate heat-assisted magnetic recording.

In conjunction with the system, the recording head, and the method described above with respect to FIGS. 1-19, light delivery to a slider waveguide associated with a slider is described, which illustrates good tolerance of alignment of the tapered waveguide relative to the slider waveguide. In a particular example, the tapered waveguide has a low refractive index contrast and is adapted to expand a propagated light beam and to direct the propagated light beam (via an output grating or a wedged mirror) onto a grating coupler of the slider to match a size of the grating coupler and a corresponding opening of a focusing element in the slider.

The beam exits from the tapered waveguide and illuminates the grating coupler of the slider, which is adapted to couple an elliptical beam into an optically transparent core of the slider waveguide. Good tolerance is achieved through beam expansion and direction of the expanded beam out from the channel waveguide and into the slider waveguide via the grating coupler. In a particular example, the expanded beam is directed out from the channel waveguide via mirror, an output grating, or any combination thereof.

It is to be understood that even though numerous characteristics and advantages of various embodiments have been set forth in the foregoing description, together with details of the structure and function of the various embodiments, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the heat-assisted recording system while maintaining substantially the same functionality without departing from the scope and spirit of the present invention. In addition, although an embodiment described herein is directed to a slider waveguide having an associated grating coupler to couple an elliptical beam from a wedged mirror of a tapered waveguide into an optically transparent core of the slider waveguide, it will be appreciated by those skilled in the art that the teachings of the present disclosure can be applied to other optical couplings between adjacent optically transparent media, without departing from the scope and spirit of the present invention.

What is claimed is:

1. A recording head comprising:
a tapered waveguide adapted to propagate light from a light source in a direction that is substantially parallel to a surface of a storage medium, the tapered waveguide adapted to output an elliptical beam in a direction that is not parallel to the surface of the storage medium;
a slider waveguide extending substantially normal to a surface of the storage medium; and
a grating adapted to couple the elliptical beam into the slider waveguide.

2. The recording head of claim 1, wherein the grating comprises a plurality of grooves etched into a surface of the slider waveguide.

3. The recording head of claim 2, wherein the slider waveguide includes a grating region that comprises a mirror layer, a bottom dielectric layer, a core layer, a top dielectric layer, and an overcoat layer, and wherein the grating is etched into the core layer from the top dielectric layer.

4. The recording head of claim 1, wherein the elliptical beam has a beam size incident on the grating that is approximately equal to a size of the grating.

5. The recording head of claim 1, wherein the tapered waveguide has a linear taper to expand the light into the elliptical beam.

6. The recording head of claim 1, wherein the tapered waveguide has a parabolic taper to produce an elliptical beam having a Gaussian-like amplitude profile and a substantially flat wavefront.

7. A system comprising:
a storage medium;
a recording head that is movable relative to the storage medium and that is adapted to record data to the storage medium, the recording head comprising:
a slider waveguide extending normal to a surface of the storage medium and adapted to direct light onto the surface;
a grating associated with the slider waveguide and adapted to couple the light into the slider waveguide; and
a tapered waveguide to propagate the light from a laser source to an output and to shape the light into a beam onto the grating via the output such that the beam has a beam size that matches a size of the grating.

8. The system of claim 7, wherein the beam comprises an elliptical beam and wherein the grating is adapted to couple the elliptical beam having an elliptical intensity profile into the slider waveguide.

9. The system of claim 8, wherein the tapered waveguide includes a beam expander to produce the elliptical intensity profile.

10. The system of claim 9, wherein the beam expander comprises at least one of a linear taper, a parabolic taper, a mode-index lens, and a diffraction optical element.

11. The system of claim 7, wherein the tapered waveguide extends in a direction that is substantially normal to the slider waveguide, the tapered waveguide including an end mirror adapted to direct the beam onto the grating.

12. The system of claim 7, wherein the size of the beam is determined by a mode confinement of the tapered waveguide in a direction normal to the waveguide and by a distance between an end of the tapered waveguide and the grating.

13. The system of claim 7, wherein the slider waveguide includes a grating region comprising a mirror layer, a bottom dielectric layer, a core layer, a top dielectric layer, and a thick dielectric overcoat layer.

14. The system of claim 13, wherein the grating is etched into the core layer from the top dielectric layer.

15. The system of claim 7, wherein the grating comprises a plurality of etched grooves having a depth of approximately 100nm and a periodicity of approximately 750nm.

16. A method comprising:
focusing light from a light source into an elliptical beam via a tapered waveguide;
coupling the elliptical beam from the tapered waveguide into a slider waveguide via a grating, wherein focusing the light from the light source into an elliptical beam comprises the tapered waveguide expanding a width of the light so that the width of the elliptical beam is approximately equal to a width of the grating; and focusing the elliptical beam into a focused beam via the slider waveguide to locally heat a spot at a surface of a recording media.

17. The method of claim 16, wherein the tapered waveguide includes a minor adapted to direct the light out of the tapered waveguide and onto the grating of the slider waveguide.

18. The method of claim 16, wherein the grating is adapted to couple the elliptical beam to the slider waveguide with good optical alignment tolerance.

19. The method of claim 16, further comprising applying a magnetic field to the spot at the recording media to record data to the recording media.

* * * * *